United States Patent
Matsuyuki et al.

(10) Patent No.: US 9,727,178 B2
(45) Date of Patent: Aug. 8, 2017

(54) OPAQUE WHITE COATING WITH NON-CONDUCTIVE MIRROR

(71) Applicant: Apple Inc., Cupertino, CA (US)

(72) Inventors: Naoto Matsuyuki, Aichi (JP); Douglas J. Weber, Arcadia, CA (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 14/019,352

(22) Filed: Sep. 5, 2013

(65) Prior Publication Data

US 2015/0062709 A1    Mar. 5, 2015

(51) Int. Cl.
 *G02B 1/10* (2015.01)
 *G06F 3/044* (2006.01)
 (Continued)

(52) U.S. Cl.
 CPC .......... *G06F 3/044* (2013.01); *C03C 17/3417* (2013.01); *C03C 17/36* (2013.01); *C03C 17/3639* (2013.01); *C03C 17/3649* (2013.01); *C03C 17/3657* (2013.01); *G02B 5/0236* (2013.01); *G02B 5/0289* (2013.01); *G02B 5/22* (2013.01); *H04M 1/0283* (2013.01);
 (Continued)

(58) Field of Classification Search
 CPC ...... G02B 5/22; G02B 5/0289; G02B 5/0239; G02B 5/26; G02B 5/285; G02B 5/0833; G02B 5/282; G02B 5/3041; G06F 3/044; C03C 17/3417; C03C 17/36; C03C 17/3639; C03C 17/3649; C03C 17/3657; C03C 2217/42; C03C 2217/477; C03C 2217/485; C03C 2217/734; H04M 1/0283; H04M 2250/22; G02F 2001/133545; B32B 17/10174
 USPC ........ 359/359, 584, 586; 362/560, 624, 627; 427/287; 428/210
 See application file for complete search history.

(56) References Cited

U.S. PATENT DOCUMENTS 1,608,108 A    11/1926  Martus et al.
2,473,848 A     8/1947  Baxter
(Continued)

FOREIGN PATENT DOCUMENTS

CN    201945987    8/2011
CN    102725663    10/2012
(Continued)

OTHER PUBLICATIONS

Jaeger, "Color Solid Ink Printing," imaging.org, 4 pages, at least as early as Sep. 23, 2014.
(Continued)

*Primary Examiner* — Bumsuk Won
*Assistant Examiner* — Collin X Beatty
(74) *Attorney, Agent, or Firm* — Kendall W. Abbasi

(57) ABSTRACT

An opaque cover is provided for a capacitive sensor. The cover includes a transparent substrate, and at least one white coating layer including white pigments disposed over at least one portion of the transparent substrate. The cover also includes a non-conductive mirror structure disposed over the at least one white coating layer. The non-conductive mirror structure includes a number of first dielectric layers having a first refractive index interleaved with second dielectric layers having a second refractive index. The first and second dielectric layers have dielectric constants below a threshold.

34 Claims, 9 Drawing Sheets

(51) Int. Cl.
  *C03C 17/34* (2006.01)
  *C03C 17/36* (2006.01)
  *G02B 5/22* (2006.01)
  *H04M 1/02* (2006.01)
  *G02B 5/02* (2006.01)

(52) U.S. Cl.
  CPC .... *C03C 2217/42* (2013.01); *C03C 2217/477* (2013.01); *C03C 2217/485* (2013.01); *C03C 2217/734* (2013.01); *H04M 2250/22* (2013.01)

(56) References Cited

U.S. PATENT DOCUMENTS

| | | | |
|---|---|---|---|
| 2,821,589 A | 1/1958 | Needham | |
| 3,123,792 A | 3/1964 | Klemm | |
| 3,471,663 A | 10/1969 | Farrell | |
| 4,227,059 A | 10/1980 | Ogawa | |
| 4,340,791 A | 7/1982 | Sorenson | |
| 5,180,051 A | 1/1993 | Cook et al. | |
| 5,214,530 A | 5/1993 | Coombs et al. | |
| 5,327,201 A * | 7/1994 | Coleman | G03G 8/00 156/277 |
| 5,496,977 A | 3/1996 | Date et al. | |
| 5,523,125 A | 6/1996 | Kennedy et al. | |
| 5,718,326 A | 2/1998 | Larose et al. | |
| 5,936,213 A | 8/1999 | Biquez et al. | |
| 6,040,543 A | 3/2000 | Mina et al. | |
| 6,201,196 B1 | 3/2001 | Wergen | |
| 6,399,228 B1 | 6/2002 | Simpson | |
| 6,565,770 B1 * | 5/2003 | Mayer | B82Y 10/00 106/403 |
| 6,591,457 B1 | 7/2003 | Howie, Jr. | |
| 6,630,635 B1 | 10/2003 | Doepner | |
| 6,667,450 B2 | 12/2003 | Bulin et al. | |
| 6,707,358 B1 | 3/2004 | Massman | |
| 6,762,381 B2 | 7/2004 | Kunthady et al. | |
| 7,101,603 B2 | 9/2006 | Okamura et al. | |
| 7,165,846 B2 | 1/2007 | Sannohe | |
| 7,297,221 B2 | 11/2007 | Hikita | |
| 7,531,765 B2 | 5/2009 | Komagata | |
| 7,727,618 B2 | 6/2010 | Iwano | |
| 8,003,200 B2 | 8/2011 | Nashiki et al. | |
| 8,031,174 B2 * | 10/2011 | Hamblin | G06F 1/1626 345/158 |
| 8,222,773 B2 | 7/2012 | De Iuliis et al. | |
| 8,232,502 B2 | 7/2012 | Young et al. | |
| 8,529,775 B2 | 9/2013 | Costin et al. | |
| 8,640,413 B2 | 2/2014 | Ruggie et al. | |
| 9,323,365 B2 * | 4/2016 | Tenuta | G06F 3/041 |
| 2005/0287301 A1 | 12/2005 | Ljubomirsky | |
| 2006/0024476 A1 | 2/2006 | Leland et al. | |
| 2009/0237782 A1 | 9/2009 | Takamatsu et al. | |
| 2010/0026656 A1 | 2/2010 | Hotelling et al. | |
| 2011/0109590 A1 * | 5/2011 | Park | G06F 3/0412 345/174 |
| 2011/0176396 A1 * | 7/2011 | Suzuki | C03C 17/3435 368/296 |
| 2011/0177300 A1 * | 7/2011 | Hankey | G02B 5/26 428/189 |
| 2012/0103778 A1 * | 5/2012 | Obata | G06F 3/044 200/600 |
| 2013/0084430 A1 | 4/2013 | Hill et al. | |
| 2013/0098191 A1 | 4/2013 | Manullang et al. | |
| 2013/0112536 A1 | 5/2013 | Shah et al. | |
| 2013/0120314 A1 | 5/2013 | Ishibashi et al. | |
| 2013/0140746 A1 | 6/2013 | Heverly et al. | |
| 2013/0215067 A1 | 8/2013 | Hwang et al. | |
| 2013/0257237 A1 * | 10/2013 | Cao | B32B 15/08 312/204 |
| 2013/0271836 A1 * | 10/2013 | Fukaya | G02B 1/11 359/507 |
| 2014/0363608 A1 | 12/2014 | Russell-Clarke et al. | |
| 2015/0064432 A1 | 3/2015 | Matsuyuki et al. | |
| 2016/0139310 A1 * | 5/2016 | Lee | G02B 5/0825 359/584 |

FOREIGN PATENT DOCUMENTS

| | | |
|---|---|---|
| CN | 202632259 | 12/2012 |
| CN | 202649955 | 1/2013 |
| CN | 202854790 | 4/2013 |
| CN | 203366304 | 12/2013 |
| CN | 103902122 | 7/2014 |
| CN | 204242152 | 4/2015 |
| DE | 102010006665 | 8/2011 |
| EP | 0424173 | 4/1991 |
| GB | 581824 | 10/1946 |
| GB | 957644 | 5/1964 |
| JP | H0593811 | 4/1993 |
| JP | 201263839 | 3/2012 |
| JP | 2012226688 A | 11/2012 |
| JP | 2013057928 A | 3/2013 |
| JP | 2013515285 A | 5/2013 |
| JP | 2013152639 A | 8/2013 |
| JP | 201410814 | 1/2014 |
| KR | 1020090131944 | 4/2010 |
| TW | M414616 | 10/2011 |
| TW | 201231792 | 8/2012 |
| WO | 9812583 | 3/1998 |
| WO | WO01/34408 | 5/2001 |
| WO | 2009126585 | 10/2009 |
| WO | WO2011/076294 | 6/2011 |

OTHER PUBLICATIONS

International Search Report and Written Opinion, PCT/US2014/048773, 9 pages, Feb. 2, 2015.

* cited by examiner

OPAQUE WHITE COATING WITH NON-CONDUCTIVE MIRROR

TECHNICAL FIELD

Embodiments described herein generally relate to an electronic device having a thin, opaque non-conductive white coating stack. More specifically, embodiments relate to an electronic device incorporating a thin, opaque white coating stack with a non-conductive mirror layer.

BACKGROUND

Many portable digital devices incorporate at least one display screen to provide graphical information to a user or viewer. The display screen may include a liquid crystal display (LCD). Such devices may also include one or more sensors located beneath a cover glass that overlies, and typically extends beyond, the LCD. As one example, these sensors may be capacitive sensors.

The devices may also incorporate an opaque region, such as a white coating region, outside the display screen (e.g., outside the active display region) but beneath the cover glass. The opaque region may include opaque ink like white ink under a cover glass or sapphire. The devices may also incorporate a button, which is one non-limiting and non-exclusive way to permit a user to provide input to the device. When the button is implemented as or incorporating a mechanical switch, it is often located within the opaque region. The same may be true when the button is a "soft" button, e.g., is a non-moving element that senses a touch and/or force exerted on a surface of the soft button.

A sensor, such as a capacitive fingerprint or touch sensor, may be positioned under the button. Generally, the white ink should to be thin enough to make the sensor sensitive, but also optically opaque to conceal the sensor and match the coloring of the opaque region.

A white ink having good visual properties may include a high percentage of a pigment such as titanium dioxide ($TiO_2$), to obtain adequate optical density. However, $TiO_2$ pigments typically have relatively high dielectric constant, which may affect the operation of a capacitive sensor located beneath the ink layer especially when the white coating thickness increases. Further, the relative thickness of the ink layer may increase the distance between the sensor and an object it attempts to sense, such as a finger atop the button. Generally, the sensitivity of a capacitive sensor varies inversely with the square of the distance between the sensor and sensed object, so relatively small changes in distance may have large effects on sensor performance. Additionally, particles, voids, and contamination in the black ink or paints may affect the performance of the sensor and cause functional errors in sensor readings. These issues increase as the thickness of the ink layer used to color the button increases. Therefore, a thinner, non-conductive (or less conductive) white ink may be useful.

SUMMARY

Embodiments described herein may provide a thin opaque non-conductive white coating stack that makes a highly sensitive sensor, such as a capacitive sensor, underneath a cover glass or sapphire invisible. The sensor may provide very clean signal when the cover glass or sapphire is touched. The thin opaque white coating stack may include a non-conductive mirror structure that reflects light and may help reduce the thickness of the white coating, such that the sensor may become more sensitive to any touching on the cover glass or sapphire, for example, on a button located on the cover glass outside a display area and generates cleaner signal than a thicker white coating. The mirror structure also has a relatively low dielectric constant, which helps improve the performance of the capacitive sensor. The white coating is very thin with a thickness ranging from about 20 μm to 25 μm.

In one embodiment, An opaque cover is provided for a capacitive sensor. The cover includes a transparent substrate, and at least one white coating layer including white pigments disposed over at least one portion of the transparent substrate. The cover also includes a non-conductive mirror structure disposed over the at least one white coating layer. The non-conductive mirror structure includes a number of first dielectric layers having a first refractive index interleaved with second dielectric layers having a second refractive index. The first and second dielectric layers have dielectric constants below a threshold.

In another embodiment, a method is provided for forming a white coating stack over a substrate. The method includes applying at least one white coating layer over at least a portion of a transparent substrate to form a coated substrate. The method also includes forming a non-conductive mirror structure over the coated substrate, wherein the mirror structure has a dielectric constant lower than a threshold. The method further includes attaching a capacitor sensor to the mirror structure.

Additional embodiments and features are set forth in part in the description that follows, and in part will become apparent to those skilled in the art upon examination of the specification or may be learned by the practice of the embodiments discussed herein. A further understanding of the nature and advantages of certain embodiments may be realized by reference to the remaining portions of the specification and the drawings, which forms a part of this disclosure.

DETAILED DESCRIPTION

Figure 1:
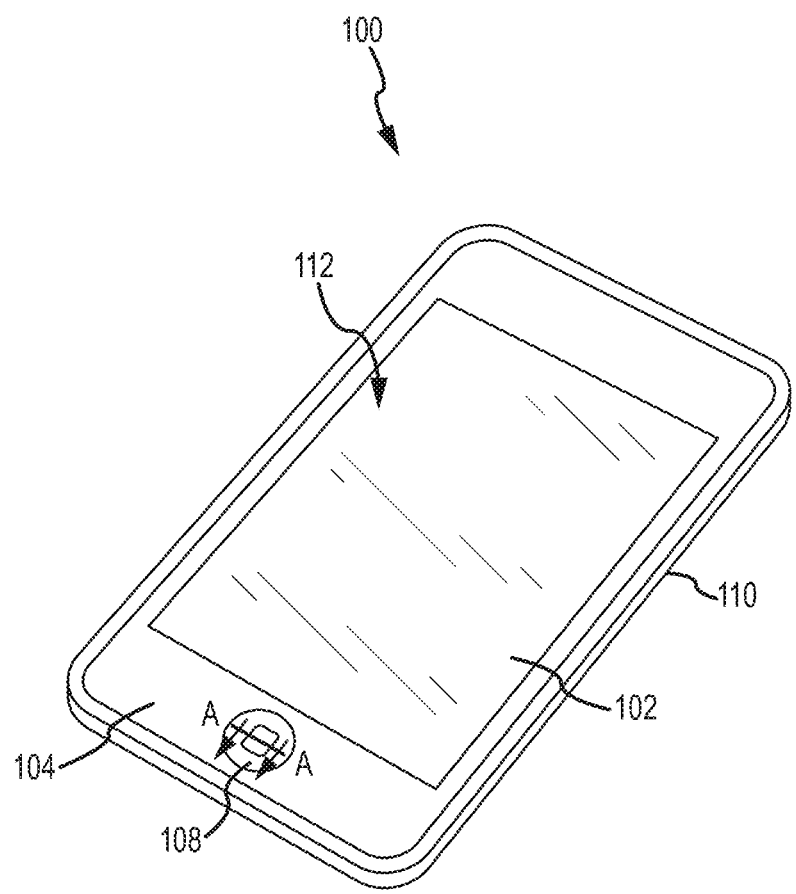
FIG. 1 illustrates a perspective view of an electronic device in accordance with embodiments of the present disclosure.

The present disclosure may be understood by reference to the following detailed description, taken in conjunction with the drawings as described below. It is noted that, for purposes of illustrative clarity, certain elements in various drawings may not be drawn to scale, may be represented schematically or conceptually, or otherwise may not correspond exactly to certain physical configurations of embodiments.

The disclosure provides a mirror structure between a white ink or coating layer and a highly sensitive sensor, such as a capacitive sensor. The white ink layer may be positioned underneath a glass or sapphire upper surface, such as a cover glass, and may conceal the capacitive sensor from sight. The white ink layer may include white pigments, such as titanium oxide ($TiO_2$). The mirror structure may include a first stack of silicon oxide ($SiO_2$) layers interleaved with niobium pentoxide ($Nb_2O_5$) layers. Both $SiO_2$ and $Nb_2O_5$ have a relatively low dielectric constant as compared to that of $TiO_2$. Further, $SiO_2$ has a different refractive index from that of $Nb_2O_5$.

The first stack acts like a mirror and reflects light in a broad range of visible light. The first stack has a relatively low dielectric constant and is non-conductive. By reflecting and/or scattering incident light through the cover glass, the first stack may help reduce the thickness of the white ink layer, such that the white ink layer may be thin enough to make the capacitive sensor underneath invisible while still allowing the capacitive sensor to sense finger touching on the cover glass or sapphire, for example, touching on a button which is a part of the cover glass. A "cover glass," as used herein, encompasses not only a transparent covering or layer over an electronic display, but any transparent material overlaying or above a sensor or sensor stack, as incorporated into and placed atop an electronic device. The upper surface of an input element, such as a mouse, button, switch and the like, may be an example of a cover glass.

The mirror structure may also include a second stack of silicon oxide layers interleaved with tin layers. The second stack may act like an isolation layer which further absorbs incident light that may pass through the first stack or dielectric mirror. The second stack includes tin as a light absorption element, as tin has relatively high light absorption. In some embodiments, tin may be replaced by copper oxide (CuO) or zinc oxide (ZnO) or another light absorption material that is non-conductive. Silicon oxide is an insulator with a relatively low dielectric constant, and thus helps improve the performance of the capacitive sensor as compared to an insulator with a relatively high dielectric constant such as $TiO_2$.

The mirror structure may be formed by physical vapor deposition (PVD) or other deposition techniques. Methods for applying the white ink layer on a cover glass or sapphire may include heat transfer, among others.

By including the mirror structure underneath the white ink layer, the white ink layer may be made as thin as 20 μm to 25 μm, which is about half of the conventional 40-50 μm thickness of a white coating loaded with about 50% $TiO_2$. A thickness of 20 μm or more may be required to conceal the sensor in the stack and/or to achieve adequate optical density for the opaque cover glass with the mirror structure, for example, to have at least an optical density of 3 or greater. A thickness of about 25 μm or less may help improve the performance of the capacitive sensor. Additionally, thinner white coatings may also reduce the amount of $TiO_2$ and thus the amount of materials in the stack that have a relatively high dielectric constant. Both a thinner white coating and reduced amount of high dielectric materials may enhance the effective range of the capacitive sensor and/or the signal quality.

FIG. 1 illustrates a perspective view of an electronic device according to embodiments of the present disclosure. Electronic device 100 may include a display 102 on a surface of a device enclosure (or forming part of a device enclosure) operative to display information to users. The display 102 may also be touch sensitive.

The display may be a liquid crystal display (LCD) an organic light emitting diode (OLED) display, LED display, plasma display, and the like.

Electronic device 100 may be any of a variety of devices utilizing a hard substrate as a covering or window. The variety of devices may include a mobile phone, tablet computer, notebook computer, instrument window, appliance screen and the like. Electronic device 100 may include a top cover 112, which covers the display 102, and optionally an opaque region 104 surrounding the display 102. In the opaque region 104, the cover 112 is partially coated with an opaque coating, such as a white coating or a black coating. Cover 112 may have a transparent window (e.g. a glass or sapphire substrate) for viewing the display 102.

As shown in FIG. 1, the opaque region 104 is outside the display 102 or the active region. Opaque region 104 may include a button 108 as an input mechanism for controlling the operation of the electronic device. One capacitive sensor or more sensors may be located underneath the button 108. An opaque ink layer and/or adhesive may be placed between the bottom surface of the button 108 and the top surface of the sensor. An adhesive may bond the sensor to the button. Opaque region 104 may be white or black or any other color.

The sensor may sense a finger touching on the button 108 and generate an electrical voltage signal. The sensor may also capacitively sense a fingerprint through a portion of the cover 112. When the electronic device capacitively senses a touch from a user, for example, on the button, the device may activate the capacitive sensor at, under or near the location at which a touch was sensed. In some embodiments, only capacitive sensors corresponding to the touch location may be activated while other capacitive sensors remain inactive.

Top cover 112 is supported by a housing 110. The housing 110 may be formed of a variety of different materials including, but not limited to, polymer materials (e.g. plastics), metals (e.g. aluminum, steel, etc.), amorphous glass materials, composite materials, and combinations thereof.

Figure 2:
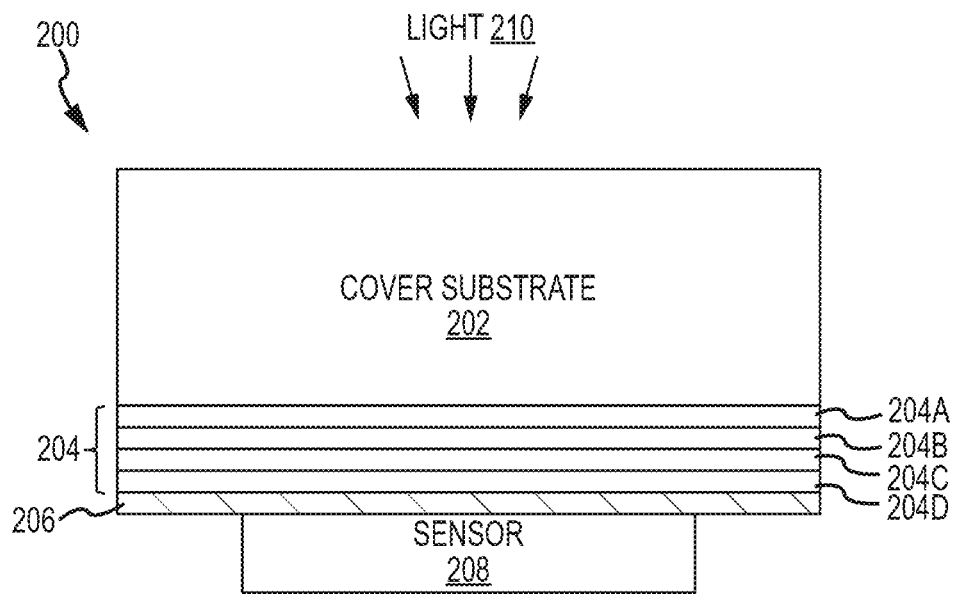
FIG. 2 illustrates a cross-sectional schematic view of opaque region in accordance with a first embodiment of the present disclosure.

FIG. 2 illustrates a cross-sectional schematic view of opaque region 104 in accordance with a first embodiment of the present disclosure. The cross-section may be taken along arrows A-A in FIG. 1. Stack 200 includes a cover substrate 202, such as a cover glass or cover sapphire on the top of the stack, and a white coating layer 204 (which may include white pigment sublayers 204A-D) under the cover glass. Stack 200 also includes a gray ink layer 206 under the white coating layer 204. Stack 200 further includes a capacitive sensor 208 at the bottom of the stack. The gray ink layer 206 absorbs light mostly, because the white ink generally has a high light transmittance while the gray ink generally has a low light transmittance. It should be appreciated that different embodiments may have more or fewer white pigment sublayers than shown.

The white coating layer may be at least approximately 40~50 µm thick in order to provide an optical density of at least 3 or higher, which may conceal the capacitive sensor 208 underneath the cover substrate 202. With such a large coating thickness, the effectiveness of the sensor 208 may be significantly reduced.

Figure 3:
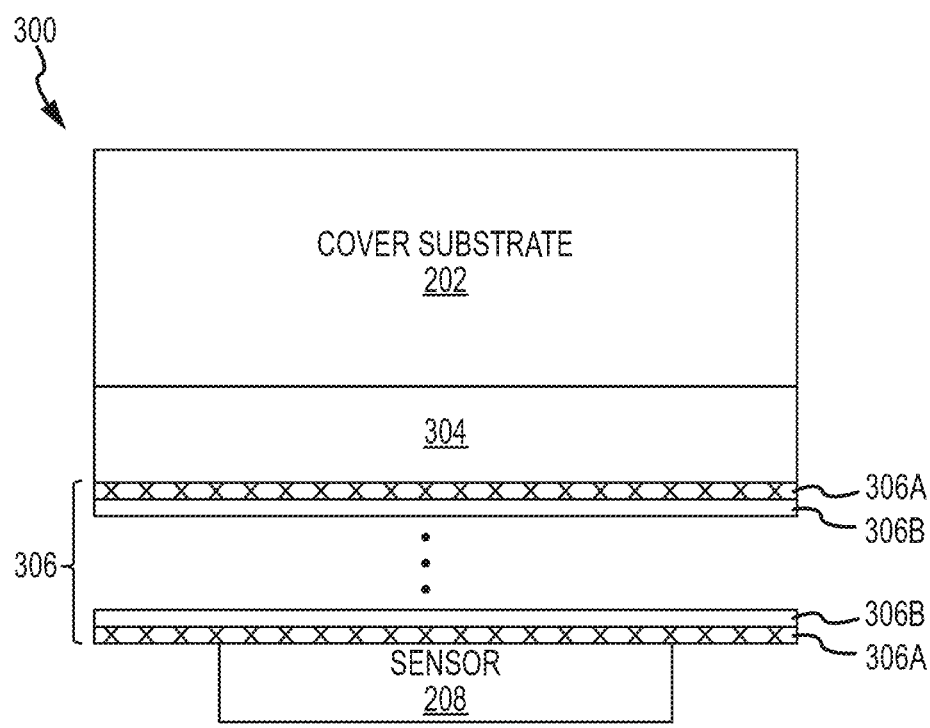
FIG. 3 illustrates a cross-sectional schematic view of opaque region in accordance with a second embodiment of the present disclosure.

FIG. 3 illustrates a cross-sectional schematic view of opaque region 104 in accordance with a second embodiment of the present disclosure. Stack 300 includes the cover substrate 202 on the top and a white ink layer 304 underneath the cover glass. The white ink layer 304 may include a number of sublayers (not shown). Stack 300 also includes a non-conductive light absorbing stack 306, including one or more dielectric layers (e.g. silicon oxide layers) 306A interleaved with light absorption layers 306B, such as tin layers 306B. The non-conductive light absorbing stack 306 may replace the gray ink layer 206 shown in FIG. 2. Stack 300 further includes a capacitive sensor 208 attached to the bottom of the non-conductive light absorbing stack 306.

Generally, tin has high light absorption with respect to visible wavelengths. By using thin tin (Sn) layers 306B interleaved with thicker non-conductive layers/dielectric layers (e.g. $SiO_2$ layers) 306A, a very high resistance coating with high opacity may be achieved. Tin is normally conductive. However, tin becomes non-conductive when the thickness of the tin layer is kept under about 100 nm. The tin may include some grain structure (or be entirely a grain structure) at such thicknesses, and thus be non-conductive.

In a particular embodiment, non-conductive light absorbing stack 306 may include seven layers of silicon oxide 306A interleaved with six layers of tin 306B, or more generally N layers of silicon oxide interleaved with N−1 tin layers. As shown in FIG. 3, a top silicon oxide layer 306A is attached or adjacent to the white ink layer 304, while a bottom silicon oxide layer 306A is attached, adjacent or near the capacitive sensor 208. In some embodiments, one silicon oxide layer may have a different thickness from another silicon oxide layer. Likewise, one tin layer may have a different thickness from another tin layer. In a particular embodiment, each of the silicon oxide layers or each of the tin layers has substantially the same thickness. The white ink layer 304 may include white ink or pigment sublayers 204A-D and may have a thickness of about 40-50 µm to make the capacitive sensor invisible from the cover substrate 202 on the top.

Figure 12:
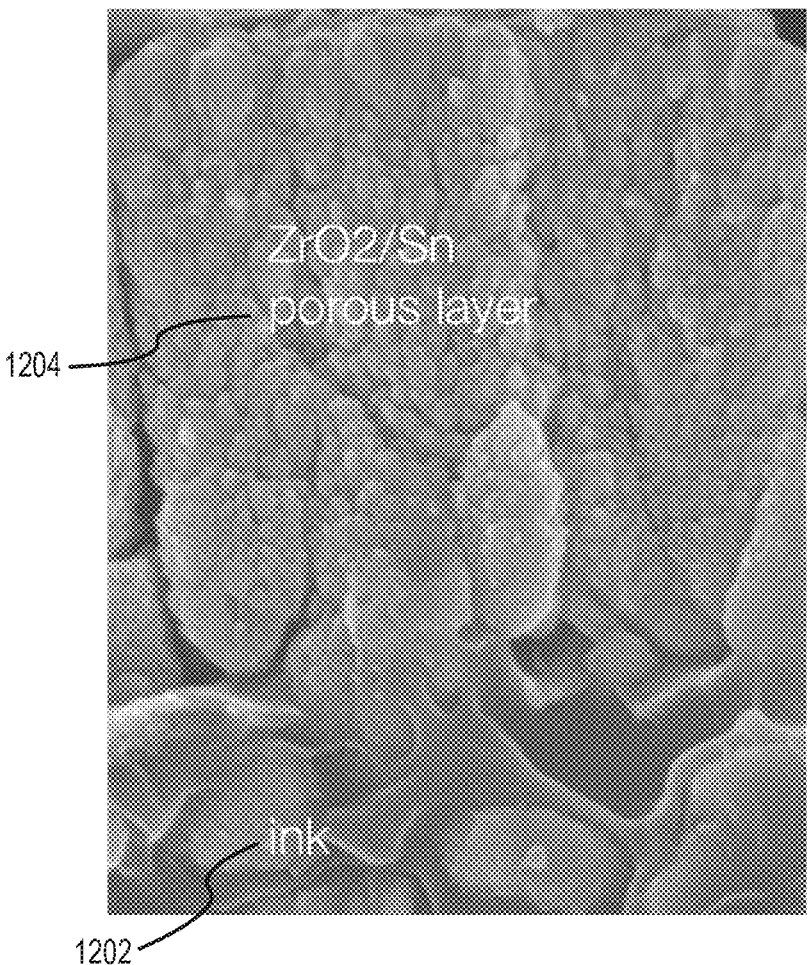
FIG. 12 illustrates a Scanning Electron Microscope (SEM) image of a cross-section of the white coating with light absorbing stack including zirconia oxide ($ZrO_2$)/tin (Sn).

In some embodiments, non-conductive light absorbing stack 306 may include seven zirconia oxide ($ZrO_2$) layers 306A interleaved with six tin layers 306B. One of the benefit of the ZrO2 is that it has very good oxygen permeability. The reason for the very good oxygen permeability is due to the high porous microstructure. FIG. 12 illustrates a Scanning Electron Microscope (SEM) image of a cross-section of the white coating with light absorbing stack including zirconia oxide ($ZrO_2$)/tin (Sn). The $ZrO_2$/Sn 1204 shows a porous structure above white ink 1202. The good oxygen permeability helps minimize discoloration due to UV light during the use of the electronic device.

In a particular embodiment, the tin layers may be about 15 nm thick so that the tin layer is non-conductive. The top $ZrO_2$ layer and the bottom $ZrO_2$ layer may be thicker than the middle $ZiO_2$ layers in the light absorbing stack 306 for better oxygen permeability. The top and bottom $ZrO_2$ layers may be 100 nm thick, while the middle $ZrO_2$ layers may be about 30 nm thick such that the total thickness of the light absorbing stack 306 may be about 1070 nm thick. It will be appreciated by those skilled in the art that the thicknesses of these layers may vary.

In the present disclosure, the gray ink layer 206 or the non-conductive light absorbing stack 306 may be replaced with a non-conductive mirror structure, which may be fabricated by a deposition method, such as physical vapor deposition, chemical vapor deposition, ion beam deposition, or sputter deposition among others. The mirror structure may help reduce the thickness of the white coating or white coating layer to nearly half its normal thickness, i.e. from about 40 µm~50 µm to about 20 µm~25 µm. The reduction in thickness of the white coating is achieved by scattering and/or reflecting light by the mirror structure such that the optical density is maintained as the same level as the thicker white coating without the mirror structure, such as the same as for stacks 200 or 300. As a result, the white coating may be made thinner, which may reduce the distance between the sensor and a sensed object.

Figure 4:
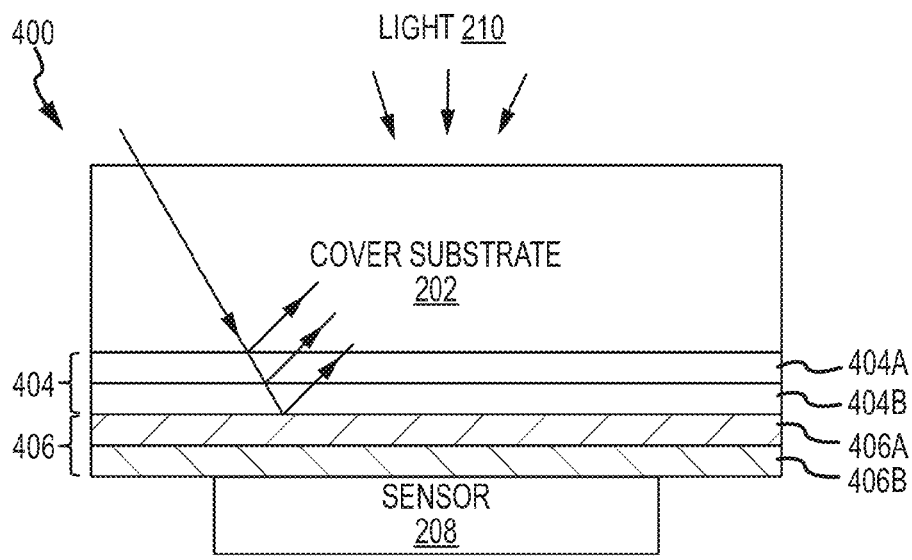
FIG. 4 illustrates a cross-sectional schematic view of opaque region in accordance with a third embodiment of the present disclosure.

FIG. 4 illustrates a cross-sectional schematic view of region 104 in accordance with a third embodiment of the present disclosure. Stack 400 includes the cover substrate 202 on the top of the stack, a white ink layer 404 underneath the cover glass, and a capacitive sensor 208 at the bottom of the stack. The white ink layer 404 may include sublayers 404A and 404B in a particular embodiment.

Stack 400 also includes a non-conductive mirror structure 406 positioned between the white ink layer 404 and the capacitive sensor 208. The mirror structure 406 includes a light reflection stack 406A that reflects and/or scatters incident light 210 back to the white ink layer 404. The reflection stack 406A may be formed from multiple layers of alternating dielectric materials, at least some of which may have different refractive indexes. For example, a first and second dielectric material, each with a different refractive index, may be interleaved with one another to form the alternating layers. The mirror structure 406 may also include a non-conductive light absorbing stack 406B under the light reflection stack 406A. The non-conductive light absorbing stack 406B may be similar to non-conductive light absorbing stack 306, and may absorb light passing through the light reflection stack 406A. That is, the light reflection stack 406A may not completely reflect all incident light and so a portion of the incident light may impinge on the light absorbing stack 406B.

The mirror structure 406 may replace the gray ink layer 206, shown in FIG. 2, or the non-conductive light absorbing stack 306 of silicon oxide layers 306A interleaved with tin layers 306B, shown in FIG. 3.

The thinned white coating with the mirror structure generally has less $TiO_2$ than a typical $TiO_2$-based white coating with equivalent optical density to the thinned white coating, and thus has a lower effective dielectric constant in comparison. The thinned white coating and lower effective dielectric constant may help the sensor to provide a much cleaner signal, i.e. a signal with significantly improved ratio of signal-to-noise, and/or sense objects at a greater distance.

Figure 5:
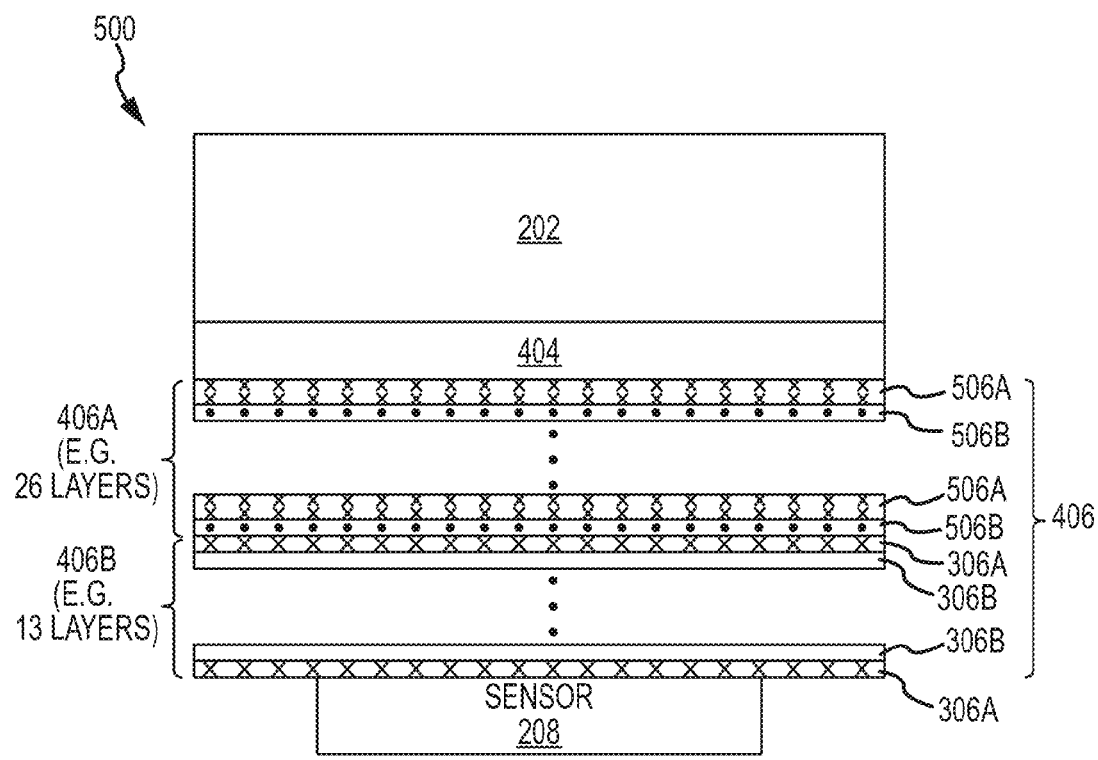
FIG. 5 illustrates a cross-sectional schematic view of opaque region in accordance with a fourth embodiment of the present disclosure.

FIG. 5 illustrates a cross-sectional schematic view of an opaque region 104 in accordance with a fourth embodiment of the present disclosure. Stack 500 may include a cover substrate 202 and a white ink layer 404 formed of white coating sublayers underneath the cover glass. Stack 500 also includes a capacitive sensor 208 at, or adjacent, the base of the stack. Stack 500 further includes a mirror structure 406 between the sensor 208 and the white ink layer 404.

The mirror structure 406 may include a light reflection stack 406A formed from interleaved first and second dielectric layers. The first dielectric layers may have a first refractive index 506A while second dielectric layers may have a second, different refractive index 506B. Both first and second dielectric layers may have a relatively low dielectric constant. For example, the first dielectric layer may be formed from $SiO_2$ which has a relatively low dielectric constant (e.g., about 3.9). By contrast, the dielectric constant of a typical $TiO_2$-based white pigment is 86-173. $SiO_2$ further is a light diffuser, having a refractive index of about 1.5. $SiO_2$ is also a common electrical insulator.

The second dielectric layer may be formed from niobium oxide ($Nb_2O_5$), which has a relatively low dielectric constant of about 42. $Nb_2O_5$ is also an electrical insulator.

Additionally, the first and/or second dielectric layers may be formed from $Si_3N_4$ which has a relatively low dielectric constant of about 7.5, and a refractive index of about 2 (e.g., between the refractive indexes of $SiO_2$ and $Nb_2O_5$). Each of $SiO_2$, $Si_3N_4$, and $Nb_2O_5$ has lower or significantly lower dielectric constant than the dielectric constant 3 of titanium oxide ($TiO_2$).

The mirror structure 406 may vary in reflectivity between embodiments, for example depending on the difference between the refractive index of two alternating dielectric layers. The thickness of the dielectric layers may affect the wavelength at which light may be reflected.

It may be useful to use an inorganic dielectric, such as an oxide or nitride, with a relatively low dielectric constant. In some embodiments, a thin polymer film may be used. The oxides or nitrides may be deposited by vacuum technology to form very thin films.

The light reflection stack 406A formed of alternating dielectric layers having different refractive indexes generally functions as a non-conductive mirror, based on the interference of light reflected from the alternating dielectric layers. In a particular embodiment, the light reflection stack 406A may include thin layers having a relatively high refractive index interleaved with thicker layers having a relatively low refractive index.

The mirror structure 406 may also include a non-conductive light absorbing stack 406B located underneath the light reflection stack 406A. The non-conductive light absorbing stack 406B, 306 may include a number of dielectric layers 306A, such as silicon oxide layers, interleaved with light absorbing layers 306 B, such as tin (Sn) layers. This structure is shown generally in FIG. 3. As previously mentioned, the non-conductive light absorbing stack 406B, 306 may absorb at least some light that passes through the light reflection stack 406A.

The thickness of the tin in the non-conductive light absorbing stack 406B, 306 may be kept under about 100 nm in order to ensure the tin layer is non-conductive. The tin layer is typically a grain structure rather than a continuous structure. The non-conductive light absorbing stack 406B, 306 may simulate a gray ink layer 206 in certain embodiments.

Additionally, tin has an electrical resistivity greater than $10^6$ Ωcm when the thickness of tin is less than 100 nm (for example, where a 40 nm thick tin layer is used) which is still much lower than that of $SiO_2$. Thus, the inclusion $SiO_2$ may increase the electrical resistivity of the non-conductive light absorbing stack 406B.

In alternative embodiments, other materials may replace tin in the light absorption layers. For example, copper oxide (CuO) generally has good light absorption qualities and may form a non-conductive layer, or be used as part of a non-conductive layer. Zinc oxide (ZnO) may also be used as a light absorption layer and likewise has good resistivity.

In alternative embodiments, $SiO_2$ in the layers may be replaced by silicon nitride, such as $Si_3N_4$, or other oxides. Materials used in the layers described herein may vary in electrical resistivity. For example, $Si_3N_4$ generally has an electrical resistivity of $10^{14}$ Ωcm, which is lower than the electrical resistivity of $10^{16}$ Ωcm for $SiO_2$.

Each of layers 506A-B and 306A-B in the mirror structure 406 may vary in thickness. In some embodiment, one $SiO_2$ layer or $Nb_2O_5$ layer may have a different thickness from another $SiO_2$ layer or $Nb_2O_5$ layer. In a sample embodiment, each of the $SiO_2$ layers and/or each of $Nb_2O_5$ layers has substantially the same thickness. The layer thickness(es) of the light reflection stack 406A and/or the non-conductive light absorbing stack 406B may be selected to achieve targeted optical and electrical properties, such as a certain light reflectivity, wavelength range, light absorption, electrical resistivity and so on. Such properties may also be controlled by varying the thicknesses or materials or number of layers, such as the $SiO_2$ layer 506A, $Nb_2O_5$ layer 506B, tin layer 306A and/or $SiO_2$ layer 306B. In some embodiments, stack 500 may achieve an optical density of at least 3 and/or a sufficiently high electrical resistance that the stack 500 is essentially non-conductive.

It will be appreciated by those skilled in the art that other optical stackups may be used for the mirror structure 406. For example, the mirror structure 406 may include a non-conductive vacuum metallization (NCVM) film.

The cover substrate 202 may be optically transparent and may be formed from a variety of materials, such as glass, chemically strengthened glass, sapphire, plastic and so on. Generally, sapphire may be anisotropic and may facilitate operation of the capacitive sensor.

In various embodiments, the button and/or the cover substrate may be flat, curved, circular, square, and/or rectangular. It will be appreciated by those skilled in the art that the button and/or cover substrate may vary in shape and/or dimension.

The operation of the capacitive sensor will now be briefly discussed. The capacitive sensor detects a change in capacitance when a user's appendage (or a suitable object, such as a stylus) approaches or touches the sensor. There is a fringe electric field that extends from the capacitive sensor 208 beyond the cover substrate 202. The electrical environment changes when the appendage enters the fringe field, with a portion of the electric field being shunted to ground instead of terminating at the capacitive sensor. As a result, the capacitance of the capacitive sensor 208 decreases, which can be detected.

Figure 6:
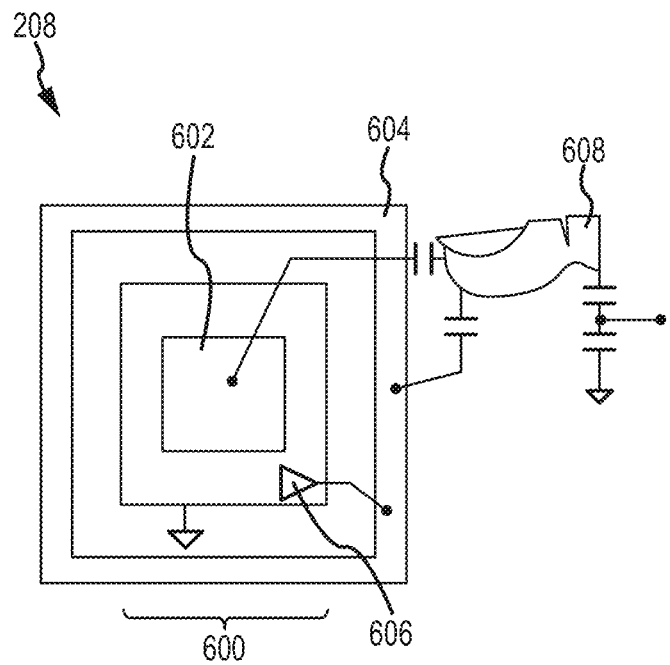
FIG. 6 illustrates a diagram including a capacitive sensor for sensing fingerprint or finger touching in accordance with embodiments of the present disclosure.

FIG. 6 illustrates a diagram of a sample a capacitive sensor for sensing fingerprints and/or touch (or near-touch) in accordance with embodiments of the present disclosure. It should be appreciated that the capacitive sensor is meant as an example only; other sensors (whether capacitive or not) may be used in various embodiments. For example, optical, pyroelectric, capacitive swipe, ultrasonic and other sensors may be used in different embodiments, and so the discussion the capacitive sensor set forth with respect to FIG. 6 is meant to be an example only.

The capacitive sensor 208 may be used to provide secure access to sensitive electronic devices and/or data. As shown in FIG. 6, the capacitive sensor 208 may include both an array of capacitive sensing elements 602 and drive ring 604. The capacitive sensing element 602 may include data or other information with respect to a relatively small region of a fingerprint image. Generally, the capacitive sensor 208 may be used to determine an image of a fingerprint through measuring capacitance through each capacitive sensing element 602 of the capacitive sensor 208.

The voltage of the array of capacitive sensing elements 602 is not directly driven or modulated, but instead drive ring 604 is modulated by a drive amplifier 606. This modulation, in turn, excites finger 608 and the voltage and/or charge at each capacitive sensing element 602 varies as drive ring 604 is modulated since finger's 608 voltage changes with the modulation of drive ring 604.

For the capacitive sensor, the voltage applied to the drive ring 604 may be limited. Generally, the voltage is no more than a threshold of 4 volts (peak-to-peak). Any voltages above this threshold for exciting the finger 608 may be detected by a person as a "tingling" or uncomfortable feeling in his or her finger. Although the exact voltage at which one can sense the tingling may vary from person to person, the 4 volt peak-to-peak voltage is generally considered as the threshold beyond which the uncomfortable feeling is noticeable.

Since the voltage of the drive ring may be restricted to avoid user perception, the thickness of any dielectric overlaying the sensor is limited. Generally, the capacitance between the sensor 208 and finger 608 decreases with increased spacing between the sensor and finger or the thickness of the dielectric layer or stack between the sensor and finger. For example, when the finger is away from the sensor 208, a lower capacitance may be generated between the sensor and finger, and thus lower voltage signals are produced on underlying capacitive sensing elements 602. By contrast, when the finger is closer to the sensor 208, a higher capacitance may be generated between the sensor and finger, and thus higher voltage signals are produced on underlying capacitive sensing elements. With reduced capacitance, the fingerprint image may become blurry. As discussed above, by reducing the white coating thickness and employing the mirror structure 406, the performance of the sensor may be improved.

Figure 7:
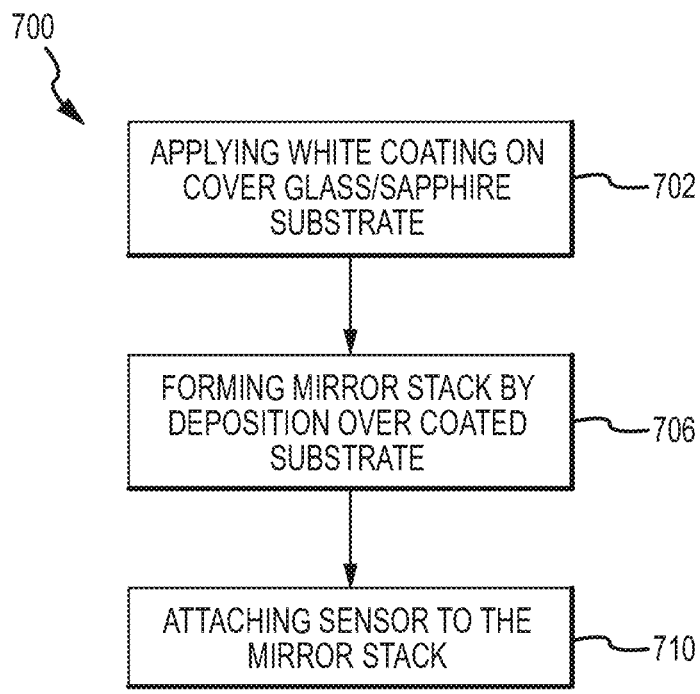
FIG. 7 is a flow chart illustrating steps for fabricating a display cover in accordance with embodiments of the present disclosure.

FIG. 7 is a flow chart illustrating steps for fabricating a display cover including a white coating and a sensor under the white coating in accordance with embodiments of the present disclosure. Method 700 starts with operation 702, in which a white coating is applied on at least one portion of a transparent cover substrate 202. The white coating or layer may be applied to a button 104 or other region outside the display area, for example.

Method 700 continues in operation 706 with the operation of forming mirror structure 406 over the coated substrate. The coating method may include, but is not limited to, physical vapor deposition (PVD), chemical vapor deposition (CVD), plasma enhanced chemical vapor deposition (PECVD), and/or ion beam assisted deposition (IBAD), among others. Method 700 further may include the operation of attaching a capacitive sensor 208 to an opposite side of the mirror structure 406 from the transparent cover substrate, as shown in operation 710.

Various techniques for applying a white coating and forming a mirror structure on a cover glass or sapphire substrate are discussed below.

Processes for Applying White Coating on Glass Substrate

The white coating 204, 304, or 404 may be applied to a glass substrate in accordance with various methods.

In one embodiment, a silk screen is used. The silk screen includes a woven mesh that transfers ink or printable materials onto a substrate. A fill blade or squeegee is moved across the silk screen, forcing the ink into the openings of the woven mesh to transfer by capillary action during a squeegee stroke. The silk screen method may have issues with coating thickness uniformity due to the mesh. For example, it may generate about a 1 µm height difference which may affect the performance of the capacitor sensor 208.

In another embodiment, a slit coating process may be used. Slit coating is a process that creates an uninterrupted curtain of fluid that falls onto a substrate. The substrate is transported on a conveyor belt at a constant speed through the curtain to ensure an even coat on the substrate. The curtain is created by using a slit at the base of a holding tank, such as a metal block, thereby allowing the liquid to fall upon the substrate.

Figure 8:
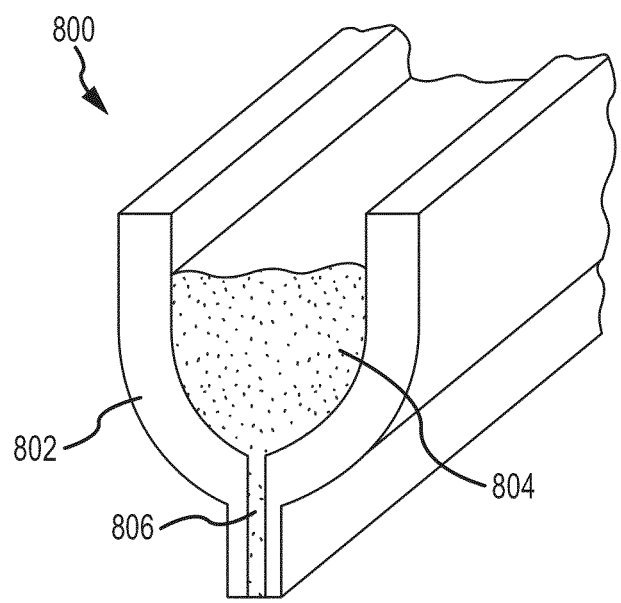
FIG. 8 illustrates a metal block in accordance with embodiments of the present disclosure.

FIG. 8 illustrates a metal block suitable for use in slit coating and in accordance with embodiments of the present disclosure. As shown, a metal block 802 may include a reservoir material 804, such as a white ink or white pigments in liquid form. The metal block 802 also includes a slit 806 at the bottom. The slit 806 allows white ink 804 to pass through to form a coating on a moving substrate.

In another embodiment, a heat transfer method may be used to deposit the white ink. Specifically, the heat transfer method uses a carrier film to roll white ink onto the carrier film, and applies the white ink to a glass or sapphire substrate by heating, followed by peeling off the carrier film from the glass or sapphire substrate.

Figure 9:
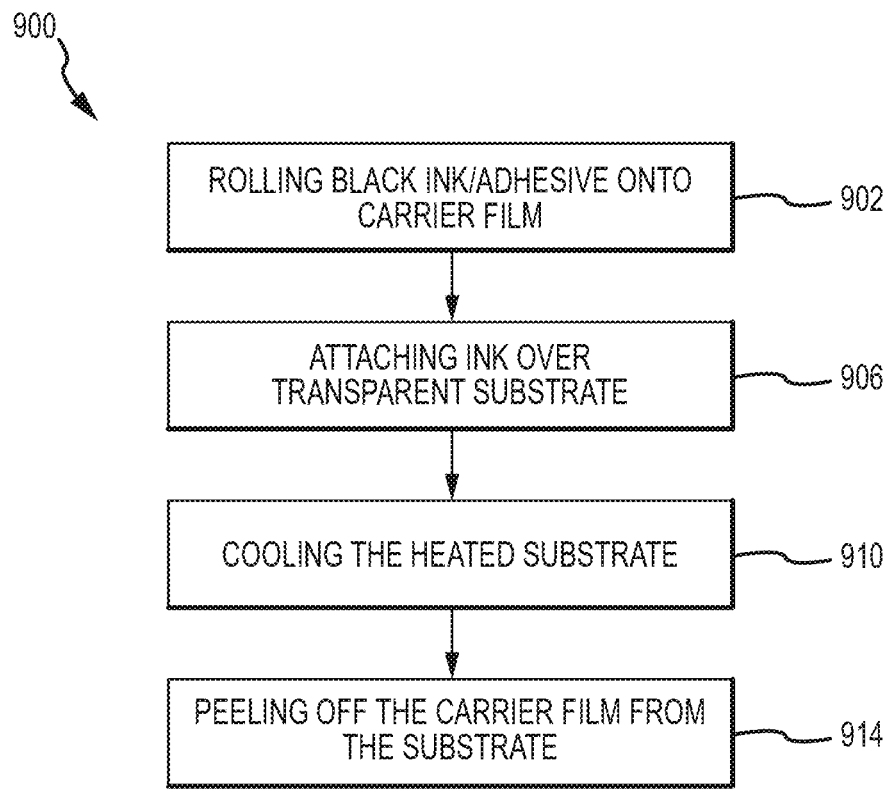
FIG. 9 is a flow chart illustrating steps for applying a white ink layer to a substrate or coated substrate in accordance with embodiments of the present disclosure.

FIG. 9 is a flow chart illustrating steps for applying a white ink layer to a substrate or coated substrate in accordance with embodiments of the present disclosure. Method 900 may start with rolling a white ink sublayer onto a carrier film, which may be a flexible polymer film, such as a polyethylene(terephthalate) (PET) film, at operation 902. Operation 906 includes attaching the carrier film with the white ink layer to a glass or sapphire substrate 202 heating and applying pressure to the carrier film while against the substrate 202, such that the white ink layer adheres to the substrate 202. The white ink or pigments may be embedded within adhesives in certain embodiments.

Method 900 may continue with cooling the heated substrate with the carrier film to form a coated substrate at operation 910, followed by peeling off the carrier film from the coated glass substrate at operation 914.

Figure 10:
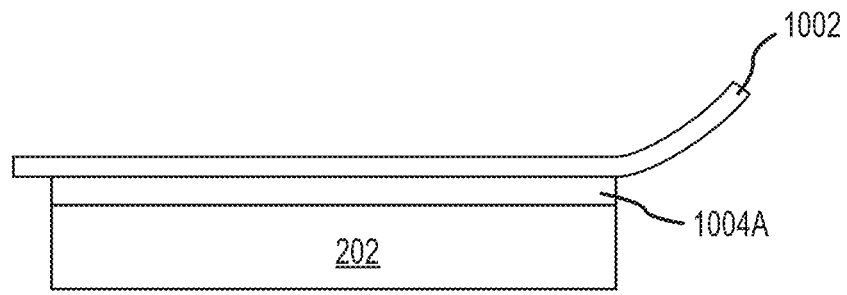
FIG. 10 shows a stack of a carrier film, a white ink/adhesive layer, and a glass or sapphire substrate in accordance with embodiments of the present disclosure.

FIG. 10 shows a stack of a carrier film 1002, a first white ink/adhesive sublayer 404A, and a cover substrate 202 in accordance with embodiments of the present disclosure. An additional white coating sublayer 404B may be applied to the coated cover substrate, along with white coating sublayer 404A, by repeating the method disclosed with respect to FIG. 9. This may provide a substantially homogeneous and uniform opaque thin film.

In a particular embodiment, each of the white coating sublayers 404A-B and 204A-D may be about 10 µm thick. Thus, heat transfer operations may provide a white coating 404 of about 20 µm to 25 µm, including two sublayers of white coating 404A, 404B. Such a thin white coating 404 may have an optical density of at least 3 or greater and may also have minimal impact on the performance of the sensor 208. Similarly, the heat transfer method may provide a white coating 204 of about 40 µm to 50 µm, including four sublayers of white coating 204A-D.

Figure 13:
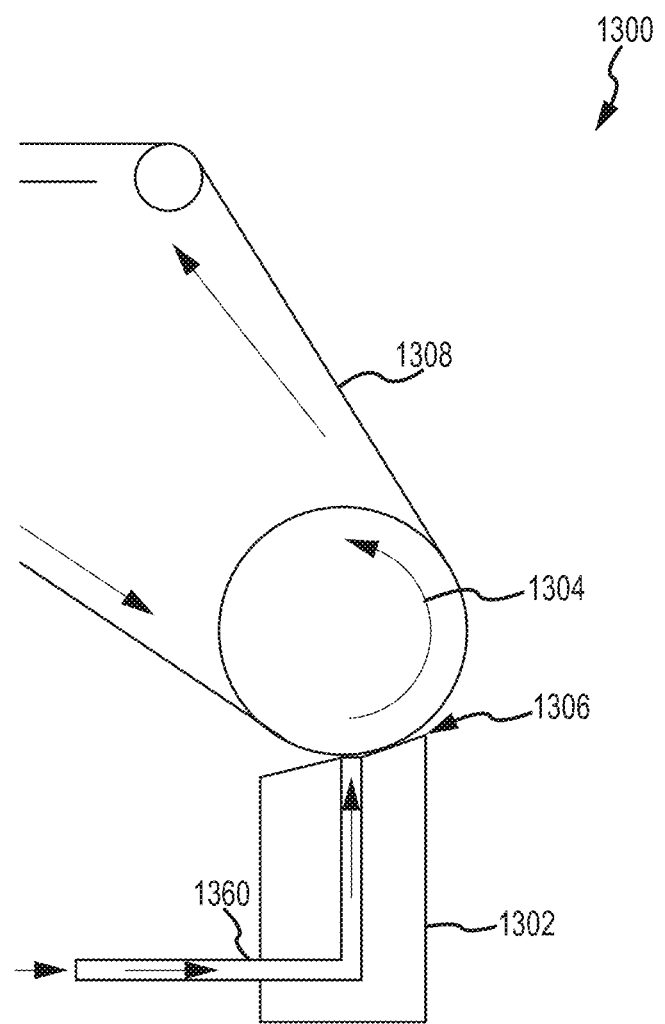
FIG. 13 illustrates a die coating device in accordance with embodiments of the present disclosure.

FIG. 13 shows a die coating device in accordance with embodiments of the present disclosure. The die coating device 1300 includes a slit die 1302, a transfer roller 1304, and a carrier film 1308, such as a PET film. The slit die has a slit opening 1306 toward the transfer roller 1304 such that when the transfer roller rotates, the ink transfers to the carrier film 1308. As shown, the white ink is pressed into an input opening 1310 of the slit die 1302 by a ink flow pressure and is output from the slit opening 1306 to transfer to the carrier film 1308 on the transfer roller 1304. The carrier film 1308 is then coated with a uniform layer of white ink while the transfer roller 1304 may rotate at a constant feed rate.

The coating thickness may be controlled by several key factors, including distance of the transfer roller 1304 to the slit opening 1306, the ink flow pressure, the feed rate of the transfer roller 1304, and ink viscosity, among others. The coating thickness formed may be thin, for example, may be equal to or less than 20 μm. One of the benefits of the die coating process is that the white coating may have very uniform thickness.

In still another embodiment, spin coating may be used to deposit the white ink. Spin coating is a procedure that is used to deposit uniform thin films on flat substrates. Generally, a small amount of coating material is applied on the center of a substrate. The substrate is then rotated at high speed in order to spread the coating material by centrifugal force. This spin coating method may create thin films with thicknesses below 10 nm. Therefore, more white coating sublayers may be deposited to form a white coating, as disclosed in FIGS. 2-5.

Process for Fabricating Mirror Structure

The various layers of the mirror structure 406 discussed herein may be formed or deposited over the substrate 202 in a variety of manners. For example, deposition technologies may include PVD, CVD, PECVD, and/or IBAD, each of which may produce layers having slightly different structures. These different structures may affect electrical properties and/or optical properties of the mirror structure, among others. The deposition of coating materials varies by process, with the specific conditions—including the atmosphere, the temperature of the substrate and chamber, the pressure, presence, ratio, type and energy of additional energetic ions, the deposition rate and the condition of the coating materials—all contributing to the final structure, composition and density that can affect the various material properties.

Figure 11:
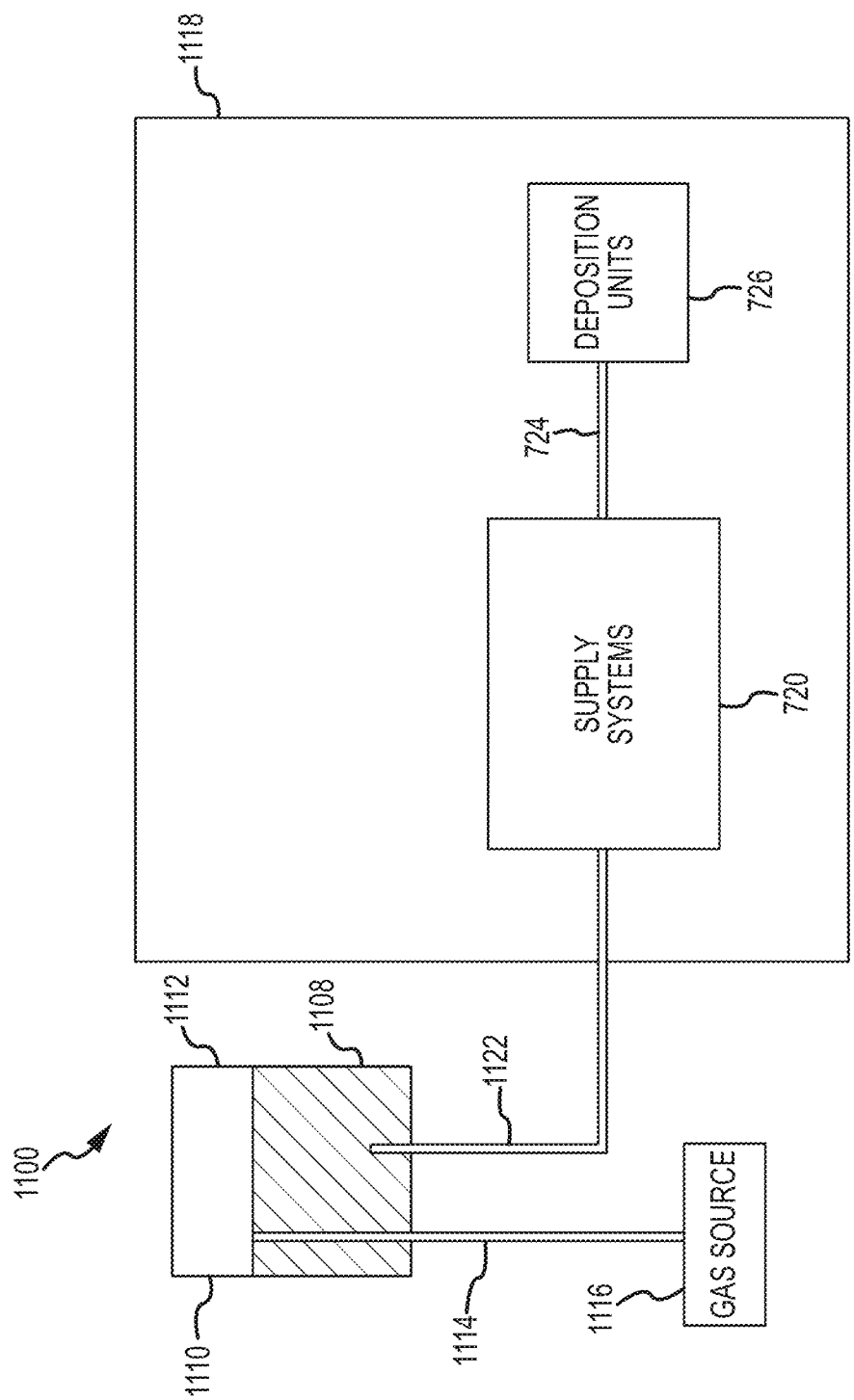
FIG. 11 is a simplified system diagram for deposition system including physical vapor deposition (PVD) in accordance with embodiments of the present disclosure.

FIG. 11 is a simplified system diagram for a PVD system according to embodiments of the present disclosure. A deposition system 1100 may apply a surface treatment to the substrate 202. In this particular example, deposition system 1100 includes one or more reservoirs 1110 holding various coating materials 1108 (e.g., $SiO_2$, $Si_3N_4$, Sn, and $Nb_2O_5$). An inert gas 1112 (e.g., argon or nitrogen) may be supplied by gas source 1116 through a purge or pressurization flow pipe 1114 in order to reduce oxidation, wetting and/or contamination within reservoirs 1110.

Depending on the design, reservoirs 1110 may be coupled to a vacuum chamber 1118 by one or more delivery tubes 1122, which may be configured to deliver materials 1108 from reservoirs 11110 to supply systems 1120. Supply systems 1120 typically utilize a suitable combination of tubes, pumps, valves and other components to direct materials 1108 into vaporizing or deposition units 1126 for deposition onto substrate 202, as shown in FIG. 2. In the particular configuration of FIG. 11, deposition units 1126 are provided in the form CVD or PVD components. Alternatively, other processes and components may be utilized to treat the substrate 202, examples of which include sputtering, electron beam deposition or electron beam evaporation, WAD, PECVD and/or a combination of such processes.

In some embodiments, deposition system 1100 also controls pressure, temperature and humidity to operate chamber 1118 as a vacuum chamber or other chemical or physical vapor deposition environment. Deposition system 1100 may also maintain a particular temperature for the surface coating process, for example, between about 100° C. and about 150° C., or between about 100° C. and about 170° C. Air may also be provided within chamber 1118, either during or after the coating process, in order to expose substrate 202 to atmosphere in a controlled process, before removal from chamber 1118.

In general, supply systems 1120 and deposition units 1126 are controlled to deposit selected amounts of material (e.g., $SiO_2$, Sn, and $Nb_2O_5$) onto substrate 202 in particular orders and combinations.

Referring to FIG. 1 again, the opaque region 104 (except button 108, or another region of the cover glass overlying a capacitive sensor) may use a conventional printing method to form a relatively thicker white coating. Under the button 108 (or other region), the mirror structure may be used to help reduce the white coating thickness to about half of that of the opaque region 104. In some embodiments, the mirror structure may be used under the entire opaque region 104.

Having described several embodiments, it will be recognized by those skilled in the art that various modifications, alternative constructions, and equivalents may be used without departing from the spirit of the disclosure. Additionally, a number of well-known processes and elements have not been described in order to avoid unnecessarily obscuring the embodiments disclosed herein. Accordingly, the above description should not be taken as limiting the scope of the document.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An electronic device, comprising:
   a capacitive sensor;
   a transparent substrate;
   at least one white coating layer including white pigments disposed on at least one portion of the transparent substrate, wherein the at least one white coating layer completely covers the capacitive sensor; and
   a non-conductive mirror structure disposed on the at least one white coating layer, wherein the non-conductive mirror structure comprises first dielectric layers having a first refractive index interleaved with second dielectric layers having a second refractive index, the non-conductive mirror structure positioned between the capacitive sensor and the at least one white coating layer, the non-conductive mirror structure configured to reflect light through the at least one white coating layer.

2. The electronic device of claim 1, wherein the non-conductive mirror structure comprises light absorption layers interleaved with third dielectric layers.

3. The electronic device of claim 2, wherein the light absorption layers comprise a material selected from a group consisting of tin, copper oxide, and zinc oxide.

4. The electronic device of claim 2, wherein the light absorption layers comprise a tin layer having a thickness equal to or less than 100 nm such that the tin layer is non-conductive.

5. The electronic device of claim 2, wherein the third dielectric layers comprise a material selected from a group consisting of silicon oxide, silicon nitride, and niobium oxide.

6. The electronic device of claim 1, wherein each of the first and second dielectric layers comprises a material selected from a group consisting of silicon oxide, silicon nitride, and niobium oxide.

7. The electronic device of claim 1, wherein the first dielectric layers comprise silicon oxide, and the second dielectric layers comprises niobium oxide.

8. The electronic device of claim 1, wherein the non-conductive mirror structure comprises a first stack of thirteen silicon oxide layers interleaved with thirteen niobium oxide layers.

9. The electronic device of claim 8, wherein the first stack of thirteen silicon oxide layers interleaved with thirteen niobium oxide layers has a total thickness of about 2.0 µm.

10. The electronic device of claim 8, wherein the non-conductive mirror structure comprises a second stack of seven silicon oxide layers interleaved with six tin layers.

11. The electronic device of claim 10, wherein the second stack of seven silicon oxide layers interleaved with six tin layers has a total thickness of about 1.2 µm.

12. The electronic device of claim 8, wherein the non-conductive mirror structure comprises a second stack of seven zirconia oxide layers interleaved with six tin layers.

13. The electronic device of claim 12, wherein the second stack of seven zirconia oxide layers interleaved with six tin layers has a total thickness of about 1.1 µm.

14. The electronic device of claim 1, wherein the transparent substrate comprises sapphire or glass.

15. The electronic device of claim 1, wherein the white coating layer comprises titanium oxide.

16. The electronic device of claim 1, wherein the white coating layer has a thickness ranging from 20 µm to 25 µm.

17. The electronic device of claim 1, wherein the opaque cover has an optical density of at least 3 or greater.

18. The electronic device of claim 1, wherein the sensor is configured to attach to the non-conductive mirror structure such that the sensor is invisible through the transparent substrate.

19. A method for forming a stack on a substrate, the method comprising:
applying at least one white coating layer on at least a portion of a transparent substrate to form a coated substrate;
forming a non-conductive mirror structure on the coated substrate, wherein the non-conductive mirror structure is configured to reflect light through the at least one white coating layer, wherein the non-conductive mirror structure comprises a light-reflecting stack and a light-absorbing stack; and
attaching a capacitor sensor to the light-absorbing stack.

20. The method of claim 19, wherein the at least one white coating layer has a thickness ranging from 20 µm to 25 µm.

21. The method of claim 19, wherein applying at least one white coating layer over at least a portion of a substrate comprises:
rolling a layer of white pigments onto a carrier film, the white pigments being embedded within adhesives;
attaching the layer of white pigments onto a substrate by heating the substrate and applying pressure to the carrier film against the substrate;
cooling the heated substrate with the carrier film to form a coated substrate; and
peeling off the carrier film from the coated substrate.

22. The method of claim 19, wherein forming a non-conductive mirror structure over the coated substrate comprises a method selected from a group consisting of physical vapor deposition (PVD), chemical vapor deposition (CVD), plasma enhanced chemical vapor deposition (PECVD), and ion beam assisted deposition (IBRD).

23. The method of claim 19, wherein the non-conductive mirror structure comprises first dielectric layers having a first refractive index interleaved with second dielectric layers having a second refractive index.

24. The method of claim 23, wherein each of the first and second dielectric layers comprises a material selected from a group consisting of silicon oxide, silicon nitride, and niobium oxide.

25. The method of claim 23, wherein the non-conductive mirror structure comprises light absorption layers interleaved with third dielectric layers.

26. The method of claim 25, wherein the light absorption layers comprise a material selected from a group consisting of tin, copper oxide, and zinc oxide.

27. The method of claim 25, wherein the light absorption layers comprise a tin layer having a thickness equal to or less than 100 nm such that the tin layer is non-conductive.

28. The method of claim 25, wherein the third dielectric layers comprise a material selected from a group consisting of silicon oxide, silicon nitride, and niobium oxide.

29. The method of claim 19, wherein the non-conductive mirror structure comprises a stack of thirteen silicon oxide layers interleaved with thirteen niobium oxide layers.

30. The method of claim 29, wherein the stack of thirteen silicon oxide layers interleaved with thirteen niobium oxide layers has a total thickness of about 2.0 µm.

31. The method of claim 29, wherein the non-conductive mirror structure comprises a stack of seven silicon oxide layers interleaved with six tin layers.

32. The method of claim 31, wherein the stack of seven silicon oxide layers interleaved with six tin layers has a total thickness of about 1.2 µm.

33. The method of claim 19, wherein the transparent substrate comprises sapphire or glass.

34. The method of claim 19, wherein the white coating stack has an optical density of at least 3 or greater.

* * * * *